United States Patent [19]
Megy

[11] Patent Number: 5,597,401
[45] Date of Patent: *Jan. 28, 1997

[54] REFRACTORY METAL SWARF COMPOSITION AND METHOD OF MAKING SAME

[76] Inventor: Joseph A. Megy, P.O. Box 91, 100 N. Chester St., New Cumberland, W. Va. 26047

[*] Notice: The term of this patent shall not extend beyond the expiration date of Pat. No. 5,171,359.

[21] Appl. No.: 338,594
[22] PCT Filed: Oct. 5, 1992
[86] PCT No.: PCT/US92/08680
 § 371 Date: Nov. 15, 1994
 § 102(e) Date: Nov. 15, 1994
[87] PCT Pub. No.: WO94/08059
 PCT Pub. Date: Apr. 14, 1994
[51] Int. Cl.$^6$ ..................................................... C22C 29/00
[52] U.S. Cl. .................. 75/304; 75/308; 75/310; 75/314; 75/255; 75/770; 134/2; 134/3; 241/3; 241/15; 241/25
[58] Field of Search ............................. 75/255, 304, 314, 75/308, 310, 770; 134/2, 3; 241/3, 15, 25

[56] References Cited
U.S. PATENT DOCUMENTS

| | | |
|---|---|---|
| 3,753,690 | 8/1973 | Emley et al. . |
| 3,980,241 | 9/1976 | Van Nocker ................................ 241/33 |
| 3,997,359 | 12/1976 | Dankoff et al. . |
| 4,015,780 | 4/1977 | Hall . |
| 4,018,633 | 4/1977 | Holland . |
| 4,090,874 | 5/1978 | Kaufman . |
| 4,097,306 | 6/1978 | Carman . |
| 4,129,443 | 12/1978 | Kaufman . |
| 4,252,577 | 2/1981 | Malard . |
| 4,940,572 | 7/1990 | Laundon et al. . |
| 5,171,359 | 12/1992 | Megy . |

Primary Examiner—Melvyn Andrews
Attorney, Agent, or Firm—William G. Lane

[57] ABSTRACT

A clean refractory metal SWARF particle product is made from refractory metal SWARF. The SWARF particles are produced with coolant at a temperature less than 650° C. to prevent formation of refractory metal oxides and nitrides. The SWARF particles are comminuted to reduce the particle size of the SWARF slivers and to liberate residual coolant The comminuted SWARF slivers are washed with a displacement wash to remove the bulk of the coolant and subject to a counter current wash to remove substantially all of the coolant components to produce to clean SWARF particles. The clean SWARF particles can be pressed into briquettes and sintered at elevated pressures or mixed with an alkali metal refractory metal halide salt, pressed at elevated pressures into SWARF/soft briquettes and dried. The briquettes are non-pyrophoric.

82 Claims, 5 Drawing Sheets 5,597,401

REFRACTORY METAL SWARF COMPOSITION AND METHOD OF MAKING SAME

BACKGROUND OF THE INVENTION

This patent relates to a process to convert slivers and fines (referred to as "SWARF" in the industry) from refractory metal (titanium and zirconium metal) grinding operations into a consolidated, safe to handle, raw material suitable for aluminum, magnesium and iron refractory metal alloys and master alloys, such as aluminum-titanium alloys, magnesium-zirconium alloys, aluminum-zirconium alloys, iron-titanium alloys, iron-zirconium alloys, aluminum-titanium-boron alloys, and the like. At present, most refractory metal products are produced from large ingots, which involve various hot forging and rolling operations. Whenever refractory metals are heated above about 700° C. in air, refractory metal oxides and nitrides are formed with large heat release varying in thickness depending on both the temperature and time. Most of the oxide is removed by mechanical means, usually sand or bead blasting. However, some of the oxide is in the form of pits which projects more deeply than average into the base metal and is not removed by these operations. The pits are usually removed by belt grinding processes in which a silicon carbide, aluminum-zirconium oxide, or other hard grit, typically about 60 mesh, bonded to a belt is moved over the surface of the metal, removing a mil to several mils of the surface per pass in the form of small curved slivers of the refractory metal. The belt grinding machine gouges the slivers of metal with each of the individual grains of grit on the belt. These fine slivers of refractory metal in bulk are called "SWARF" in the industry. The amount of SWARF generated is perhaps on the order of one percent of the weight of the metal piece being processed, depending on the thickness of refractory metal being ground. Belt grinding is also used to obtain flat surfaces on refractory metal plates and slabs and to obtain rounded surfaces on rods an other round objects.

Refractory metal particles are also produced by other abrasive operations, such as grinding with abrasive wheels or stone grinding using copious coolant. For purposes of this invention, these refractory metal particles are suitable for use in the present invention and will be understood to be included within the term "SWARF". The refractory metal particles produced from stone or abrasive wheel grinding is typically sent to a settling tank with the coolant and allowed to settle to the bottom of the tank. The coolant is recycled.

At the present time, SWARF is considered a waste product and is disposed of by burning in the open air at a remote site. SWARF has a very low ignition point and is highly pyrophoric; it combusts suddenly and violently with the rapidity and brightness of a photographic flashbulb to produce a very hazardous fire. Accordingly, SWARF must be maintained under water or under a non-oxidizing environment to reduce reaction with $N_2$ and $O_2$ in the air. This burn operation generates a thick white smoke ($TiO_2$) or ($ZrO_2$) and is receiving increasing scrutiny from regulatory agencies.

The existing grinding operations are conducted with water or a non-flammable grinding fluid (collectively "grinding fluid"). The SWARF is removed from the grinder mechanically along with the grinding fluid. The SWARF and grinding fluid frequently go through an initial screening wherein the coarse SWARF is separated from the bulk of the fines SWARF and the grinding fluid. The SWARF fines and grinding fluid are sent to a filter wherein the SWARF fines are separated from the grinding fluid. The grinding fluid is recycled back to the grinding operation. The coarse SWARF and fine SWARF are combined and disposed of by burning.

The grinding fluid usually contains components to aid in continuously cleaning the SWARF from grinding media and fire retardants. These components also unfortunately add chemical impurities to the SWARF material tending to further limit its value.

The refractory metals titanium and zirconium are made from relatively cheap and plentiful ores. The extraction, purification and consolidation of these metals is, however, expensive. Thus the metallic value in the SWARF after its removal during grinding is sufficient to warrant recovery if it can be reprocessed to eliminate its hazardous, pyrophoric nature and cleaned of components detrimental to potential end uses.

SUMMARY OF THE INVENTION

The present invention is directed to a process for producing a refractory metal product prepared from refractory metals SWARF by treatment of the SWARF from the initial stages of its production.

In one embodiment of the present invention, clean comminuted refractory metals SWARF particles are prepared from refractory metal grinding operations, typically strip refractory metal grinding operations, comprising the steps of:

conducting the refractory metal grinding operation with sufficient grinding fluid or coolant to prevent the produced SWARF refractory metal slivers from exceeding a temperature of some 650° C.;

comminuting the SWARF with adherent coolant from the grinding operation to reduce the SWARF refractory metal elongated slivers to refractory metal SWARF particles having length to width aspect ratios substantially less than the elongated slivers, the reduction is accompanied by a reduction in bulk volume of the SWARF and the release of adherent coolant;

separating the refractory metal SWARF particles from the released coolant; and washing the refractory metal SWARF particles with clean water to yield clean refractory metal SWARF particles.

Preferably before the SWARF with its adherent coolant is comminuted, the SWARF from the grinding operation is separated from the excess coolant. Preferably the SWARF and coolant are first screened to remove the coarse SWARF with some residual coolant from the fine SWARF and the excess coolant. The excess coolant is filtered from the fine SWARF to separate the fine SWARF with some adhered coolant from the bulk of the coolant which is recycled back into the grinding operation.

During the comminuting stage, the bulk volume of the SWARF is dramatically reduced to less than 50% of its pre-comminuted volume. The comminuting also releases a substantial amount of the adherent coolant, that is, coolant adhering to the SWARF refractory metal elongated slivers. The released adherent coolant separated from the SWARF particles is preferably recycled back to the grinding operation.

The comminuting operation also selectively fractures and removes hard refractory metal material as a fine dust from the SWARF particles. The hard refractory metal material is produced by the embrittlement of the refractory metal by oxygen, nitrogen and carbon from surface reactions on the refractory metal prior to or during the belt grinding, stone grinding or wheel grinding. Preferably the comminution is carried out with a detergent, such as Calgon dishwashing detergent, to solubilize oil present on the SWARF. The detergent also wets the hard refractory material fine dust to disperse the fine dust and prevent it from settling out in the comminution slurry.

If the SWARF contains iron particles, which surprisingly is not that uncommon, the iron particles are preferably removed from the SWARF. Conveniently, a substantial portion of the iron particles may be removed during the comminution operation by inserting one or more magnets into the comminuting slurry. The iron particles and any other magnetic particles, are attracted to the magnets. The magnets are withdrawn from time to time and wiped free of particles and then inserted back into the slurry. The operation is repeated until the magnets attract little, if any, particles.

Preferably, the washing of the SWARF particles comprises at least a displacement wash with water followed by filtration. The displacement wash removes a substantial amount of the remaining adherent coolant which can be recycled back to the grinding operation if the SWARF has not been treated with a detergent. If the SWARF is collected from different grinding operations, the coolants may not be compatible and the mixed coolant will not be recycled back. In a preferred embodiment, the filtered SWARF particles following the displacement wash are subject to at least three counter-current washes with water. The SWARF particles become cleaner with each succeeding wash and the washing fluid becomes progressively more contaminated with each wash. The washing fluids from the counter-current wash can be used as a displacement wash fluid.

If an ultra clean SWARF is required, after the washing step, the cleaned SWARF particles can be acid etched with a mineral acid, such as 10% hydrochloric acid, for a sufficient period to etch metallic impurities, such as iron particles, and then washed with water to remove the acid and any metal chloride salts. In another preferred embodiment of the present invention, the clean SWARF particles after the final wash are pressed at elevated pressures into SWARF briquettes or other formed body shapes (collectively "briquettes") which reduces the SWARF void volume by at least a factor of two (2). The pressing operation is carried out with the SWARF in an undried state to minimize a reaction of the clean SWARF surface with oxygen and/or nitrogen and to prevent fire. After the pressing operation, the SWARF briquettes can be dried in a vacuum dryer indirectly heated. After the briquettes are dried, they are individually wrapped to minimize oxygen profusion into the briquettes and to prevent loose SWARF particles from dropping out of the briquette. Fully wetted, in contrast to moist, briquettes can also be wrapped and boxed to prevent the loss of the water in the briquette.

The wrap or coat is not necessary for sintered briquettes because the sintering operation welds the particles together in a compact mass. With pressed briquettes, some of the SWARF particles in the briquette are not tightly compressed into the mass and can drop out of the formed or compressed mass. Individual SWARF particles, because of their high surface to volume ratio, are very susceptible to ignition from an open flame or a spark and have relatively highly reactive surfaces. The wrap or coating prevents the particles from dropping out of the briquette and forms a barrier between the briquette and the open flame, spark and air.

Conveniently the briquettes can be made in one (1) pound sizes and wrapped with aluminum foil, such as kitchen grade aluminum foil which is about two (2) mils thick. The briquette can be wrapped in aluminum foil a single layer thick. The edges of aluminum foil are preferably over lapped twice, both at the common seam and at the ends to minimize air profusion into the briquette. Heavier aluminum foil can be used and the briquette can be wrapped with double or triple layers of foil. The aluminum foil protects the briquette from sparks—aluminum is a sparkless metal—and forms a flame barrier for the briquettes. The briquettes also can be wrapped in a plastic film such as polyethylene film, a Saran brand type film, Cellophane brand type of film or other film which can be used to wrap the briquette to prevent the escape of individual SWARF particles and form a flame and spark barrier. Alternatively, the briquettes can be coated, either dip coated or spray coated, with paraffin wax, non-pigmented lacquer, non-pigmented shellac, non-pigmented varnish, non-pigmented polyurethane and the like to keep the loose SWARF particles within the briquette and to form an air, flame and spark barrier. For use with aluminum refractory metal master alloy melts, the aluminum foil appears to offer the most advantages.

The clean SWARF particles after the final wash can be disposed of as SWARF is presently disposed of, that is, by burning. Preferably, however, the clean/concentrated refractory metal SWARF particles are pressed in conventional pressing equipment into SWARF briquettes or other formed body shapes (collectively "briquettes") which reduces the SWARF void volume by at least a factor of two. The SWARF briquettes can then be sintered by heating the briquettes to temperature between 800° C. and 1100° C. under a vacuum or under an inert gas atmosphere, such as a helium gas atmosphere or argon gas atmosphere, for a period of time, such as one-half hour, sufficient to sinter the refractory metal in the briquettes to form sintered SWARF briquettes. Preferably the sintering is done at about 950° C. The briquettes have far less void volume and far less surface area than the clean concentrated refractory metal particles. The sintered briquettes are not pyrophoric, they will not burn in the presence of air. It was earlier thought that compacted SWARF sliver briquettes, as distinguished from compressed sintered SWARF briquettes, had to be stored under water or stored in an inert atmosphere or vacuum to prevent dangerous combustion.

It has now been found that compacted SWARF briquettes can be stored if the briquettes are packaged as described herein and the SWARF is dry (0.05% moisture or less) or fully wetted. Moist, in contract to wetted, refractory metal SWARF can react with water in the presence of air to produce hydrogen and refractory metal oxide. Hydrogen can vigorously react with oxygen and can initiate combustion of the refractory metal SWARF.

In another preferred embodiment of the present invention, the clean concentrated refractory metal SWARF particles are processed into a pyrophoric safe refractory metal/salt briquettes. The clean concentrated refractory metal SWARF particles, in a moist state, are mulled with an alkali metal halide salt type to produce a refractory metal/salt mixture. Sufficient alkali metal halide salt type is employed in the mixture to render the refractory metal/salt briquette product pyrophoric safe.

The refractory metal/salt mixture is pressed into refractory metal/salt briquettes; and the refractory metal/salt mixture briquettes are dried to produce dried refractory metal/salt mixture briquettes.

The clean refractory metal SWARF particles are mixed with about 30% to about 100% by weight of the metal with the alkali metal halide salt types. Thus, the dried refractory metal/salt mixture briquettes will comprise from about 23% to about 50% by weight salt with the balance being the refractory metal.

The alkali metal halide salt type can be an alkali metal refractory metal halide, such as sodium titanium fluoride, potassium titanium fluoride, sodium zirconium fluoride, potassium zirconium fluoride or the like. The salt type can also be an alkali metal halide, such as sodium fluoride, potassium fluoride, sodium chloride, potassium chloride, and the like, or a mix of an alkali metal refractory metal halide and alkali metal halide. In addition, the alkali metal halide salt type can be a sodium boron fluoride, potassium boron fluoride and the like. Preferably the alkali metal halide salt type is an alkali metal refractory metal fluoride salt wherein the refractory metal is the same as the refractory metal in the master alloy. For example, if the master alloy is to be an aluminum-titanium alloy, the preferred salt type would be an alkali metal titanium fluoride salt. If the master alloy contains boron in addition, preferably the alkali metal halide salt type will be a mixture of salts wherein one of the salts will be an alkali metal boron fluoride salt. The weight ratio of boron to the refractory metal in the salt mixtures should be the same weight ratio of the boron to refractory metal in the master alloy.

Both the refractory metal Ti and Zr particles and the Ti and Zr salts in the refractory metal/salt briquettes will report to the aluminum master alloy. The salt appears to serve as a flux which aids in the dissolution of the refractory metal particles into the aluminum, magnesium and iron master alloy. When the master alloy contains boron, the refractory metal in the Ti salts reacts with the boron salt to form $TiB_2$ alloy which reports to the aluminum master alloy. The $TiB_2$ alloy has grain refining properties in aluminum metal. The boron salt must react with a refractory metal salt to produce a $TiB_2$ alloy. The bulk refractory metal has mass transfer problems in forming the $TiB_2$ phase; thus the $TiB_2$ phase is formed with titanium and boron salts.

Thus, the pyrophoric safe refractory metal/salt briquettes can be utilized to furnish the master alloy with refractory metal or refractory metal and boron, if boron is present in the master alloy. It appears that the SWARF refractory metal in the briquette functions as a scavenger for the iron master alloy by consuming oxygen and nitrogen present in the alloy.

The refractory metal/salt mixture briquettes are dried so that the briquettes can be safely added to the master alloy. If appreciable moisture is retained in the briquettes, the moisture in the briquettes upon contact with the hot, molten master alloy reacts violently with the molten metal to form hydrogen which is hazardous.

DETAILED DESCRIPTION OF THE PREFERRED EMBODIMENT

The process of the present invention is applicable to many different alloys of titanium and zirconium. Refractory metals herein means titanium and zirconium metal and/or alloys.

Figure 1:
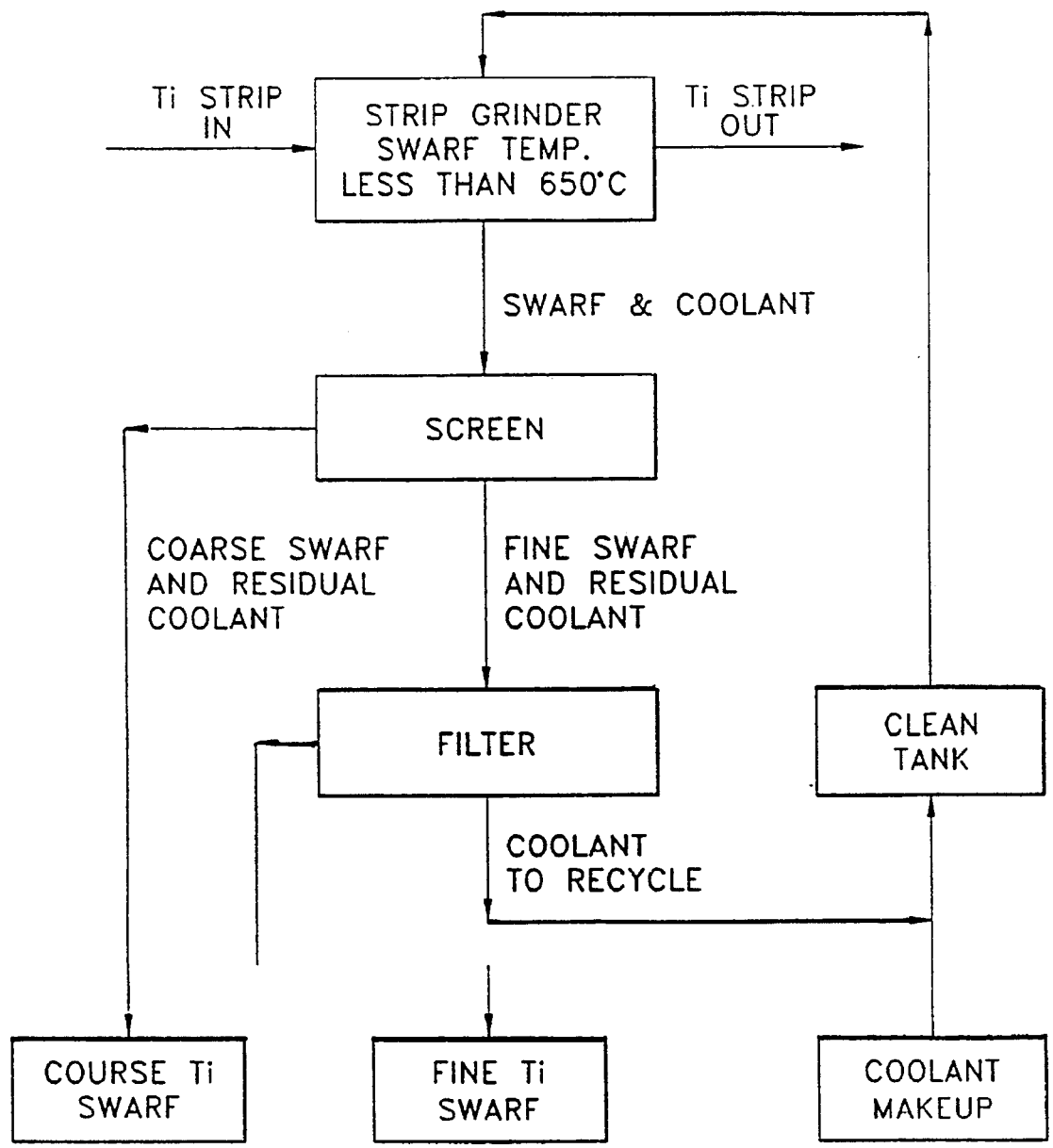
FIG. 1 is a block diagram showing a conventional method of producing SWARF improved according to the present invention.

Referring to FIG. 1, a grinding belt having a flexible fabric backing coated with silicon carbide or zirconium-aluminum oxide grit, typically about 60 mesh, is used to grind the surface of a refractory metal strip. SWARF can also be produced when surfaces of refractory metal slabs or plates are surface ground. The belt (not shown) is typically two to four feet wide and is looped over two rolls (not shown) approximately three inches in diameter, one of which is powered to rotate the belt at high speed. In operation the sheet, billet, or strip of refractory metal is passed under the moving belt with an operator controlling the pressure between the grinding media and the metal. The point of contact between the grinding media and the refractory metal surface is sprayed with grinding fluid. The fluid is mostly water. Other components include a water soluble oil, and other components such as nitrates, phosphates, organic amines, etc. which aid in keeping the grinding media clean, reducing the pyrophoric nature of the SWARF, and reducing the surface tension of the water.

The first step in the process of recovering SWARF, according to the instant invention, is to prevent excessive reaction of the SWARF with air in the grinding operation itself, which would cause the formation of refractory metal oxides and nitrides. The grinding operation can be a belt grinding, abrasive wheel grinding or stone grinding operation. Formation of the refractory metal oxides and nitrides is due to reaction with air at elevated temperatures experienced during the grinding operation. The temperature at which reaction with oxygen and nitrogen is rapid is 650° C. One step of accomplishing this goal is by using sufficient quantities of grinding fluid during the grinding operation to act as a coolant to prevent SWARF from reaching a temperature of 650° C. or more. Preferably sufficient grinding fluid (hereinafter "coolant") is used to prevent the coolant from reaching its boiling point temperature in the grinding operation. During the grinding operation, the grinding belt, wheel or stone comes in contact with a large area of the refractory metal sheet or plate. The temperature of the SWARF in this contact area varies depending upon a number of factors. The localized temperature of the SWARF must be maintained below 650° C. This is best accomplished by flooding the grinding area with grinding fluid to maintain the SWARF temperature below 650° C. Sufficient quantities of coolant are used to keep the SWARF particles awash in coolant and to prevent the coolant temperature from reaching its boiling point temperature within the grinding contact area. When the coolant temperature in the grinding operation is kept below its boiling point temperature, little, if any of the refractory metal SWARF reaches a temperature of 650° C. and the refractory metal SWARF does not react with the coolant water to produce hydrogen and refractory metal oxides.

Water based coolants are preferred due to their high heat capacity. However, other types of coolants can be used. Since the use of aqueous grinding fluid during the grinding operation is current practice, the improvement herein lies in using sufficient fluid as a coolant to prevent the SWARF from reaching 650° C. and reacting with oxygen and nitrogen to form oxide and nitride refractory metal impurities.

In a typical grinding operation, a refractory metal strip is introduced to the grinder from a coiler/uncoiler combination. These coils are typically 200 to over 1000 feet in length and vary in width from about two to four feet. The strip is ground on both sides in multiple passes until, by visual inspection, the grinder operator determines that surface flaws have been reduced to an acceptable level. The coils are weighed before and after grinding. Records of the weight changes are maintained.

During a belt grinding operation, the SWARF is continuously removed from the grinder mechanically, falling into troughs along with the coolant. The solid-liquid mixture is moved down troughs by circulating rakes and the excess coolant and SWARF are separated by filtrations. The coolant is recycled to the grinding operation.

In a conventional SWARF belt grinding process (such as shown in FIG. 1 without the temperature control during grinding), the SWARF and excess grinding fluid are screened to separate the coarse SWARF and residual grinding fluid from the SWARF fines and excess grinding fluid. The SWARF fines and residual fluid are separated from the excess fluid by filtration. The excess grinding fluid is recycled back to the grinding operation through a clean tank to permit settlement of entrained solids. The grinding fluid is moved from the tank to the grinding operation as needed. Grinding fluid make-up is added as necessary. These steps are shown in FIG. 1.

SWARF collected from a number of separate grinding operations will have different coolant compositions. In these circumstances, the mixed recovered coolant is disposed of as waste and not recycled.

Freshly produced SWARF retains appreciable amounts of coolant and thus has a high moisture content, normally in excess of 50%. Indeed, some moisture levels have been measured at 66%. The present practice in the industry at this point is to collect the SWARF in separate bins. The collected SWARF is periodically removed, transported to a remote site, allowed to dry somewhat, and burned in spectacular fires in the open. The burn is extremely rapid and violent, and it generates copious clouds of titanium or zirconium oxide dust and combustion products of the agents in the coolant.

Figure 2:
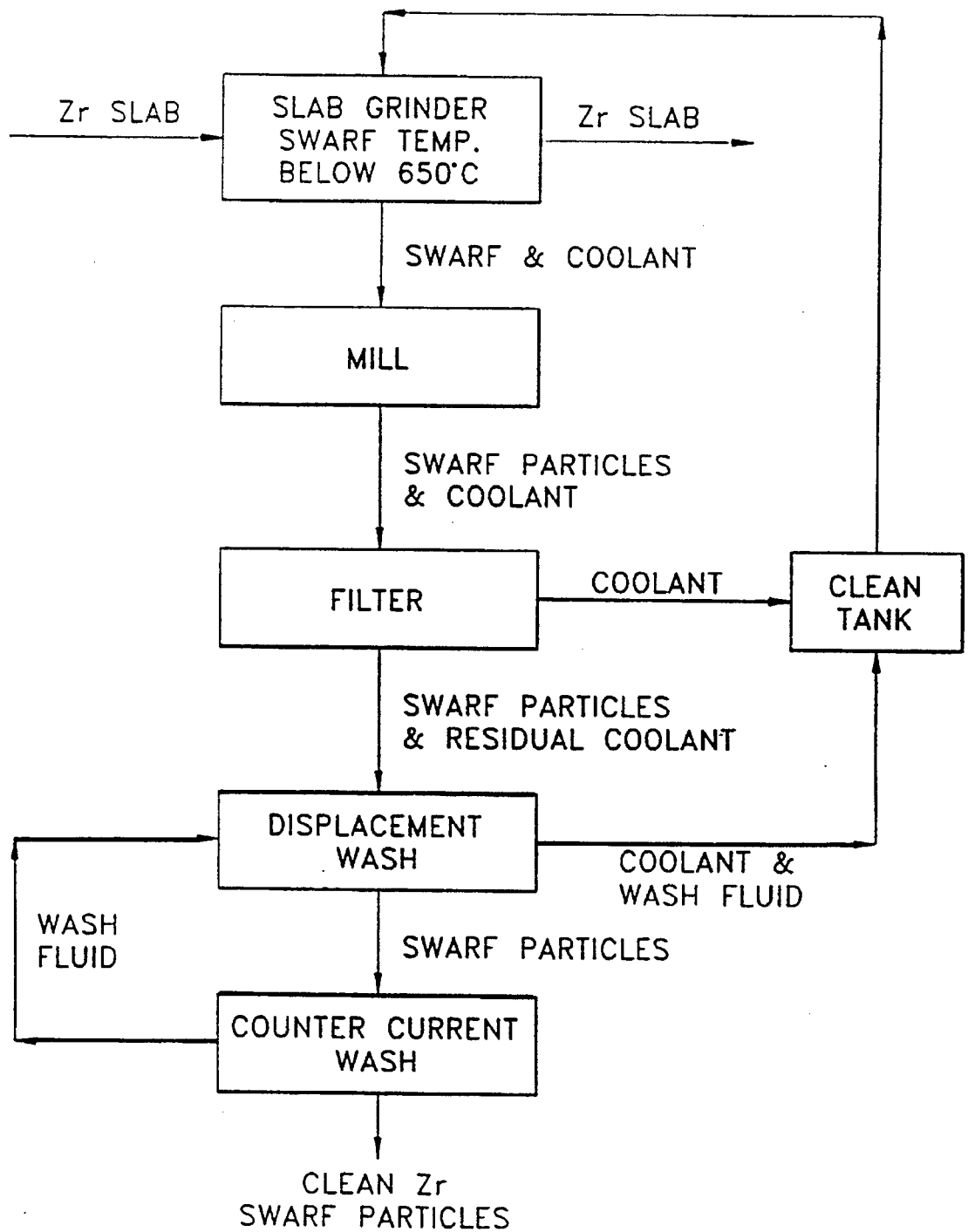
FIG. 2 is a block diagram showing the improved method of the present invention of producing clean SWARF particles.

Referring to FIG. 2, zirconium slab is fed to a slab grinder wherein the surfaces of the slab are ground, normally one at a time, with abrasive belts in the same fashion as the titanium strip was ground in the strip grinder of FIG. 1. The grinding operation is flooded with sufficient coolant to keep the SWARF awash and to prevent the coolant from reaching its boiling point temperature. This flood cooling substantially prevents the Zirconium SWARF from reaching 650° C. during the grinding operation and reacting with air to form oxide and nitride contaminates.

The SWARF and coolant are passed to a mill wherein the SWARF is comminuted to reduce the size of the SWARF slivers. The comminution reduces the SWARF bulk volume by at least half. The excess coolant is separated from the comminuted SWARF and recycled to the grinding operation via the clean tank.

The comminuted SWARF which has residual coolant is subject to a displacement wash with water or other wash solvent to remove a substantial portion of the remaining residual coolant. Conveniently the displacement wash is conducted on the filter. In a displacement wash, the comminuted SWARF is washed with an equal volume of water or other wash solvent. Surprisingly, the wash fluid after separation from the washed SWARF is slightly diluted coolant which can be recycled to the grinding operation via the clean tank. If the SWARF is collected from different sources which have different coolant formulations, the wash fluid from the displacement wash is normally not suitable for recycle. When the displacement wash is conducted on a filter, the wash fluid is separated from the washed SWARF by filtration. The SWARF and wash fluid can be separated by other conventional means, such as settling and decantation, centrifuge separation, screening and the like.

Figure 4:
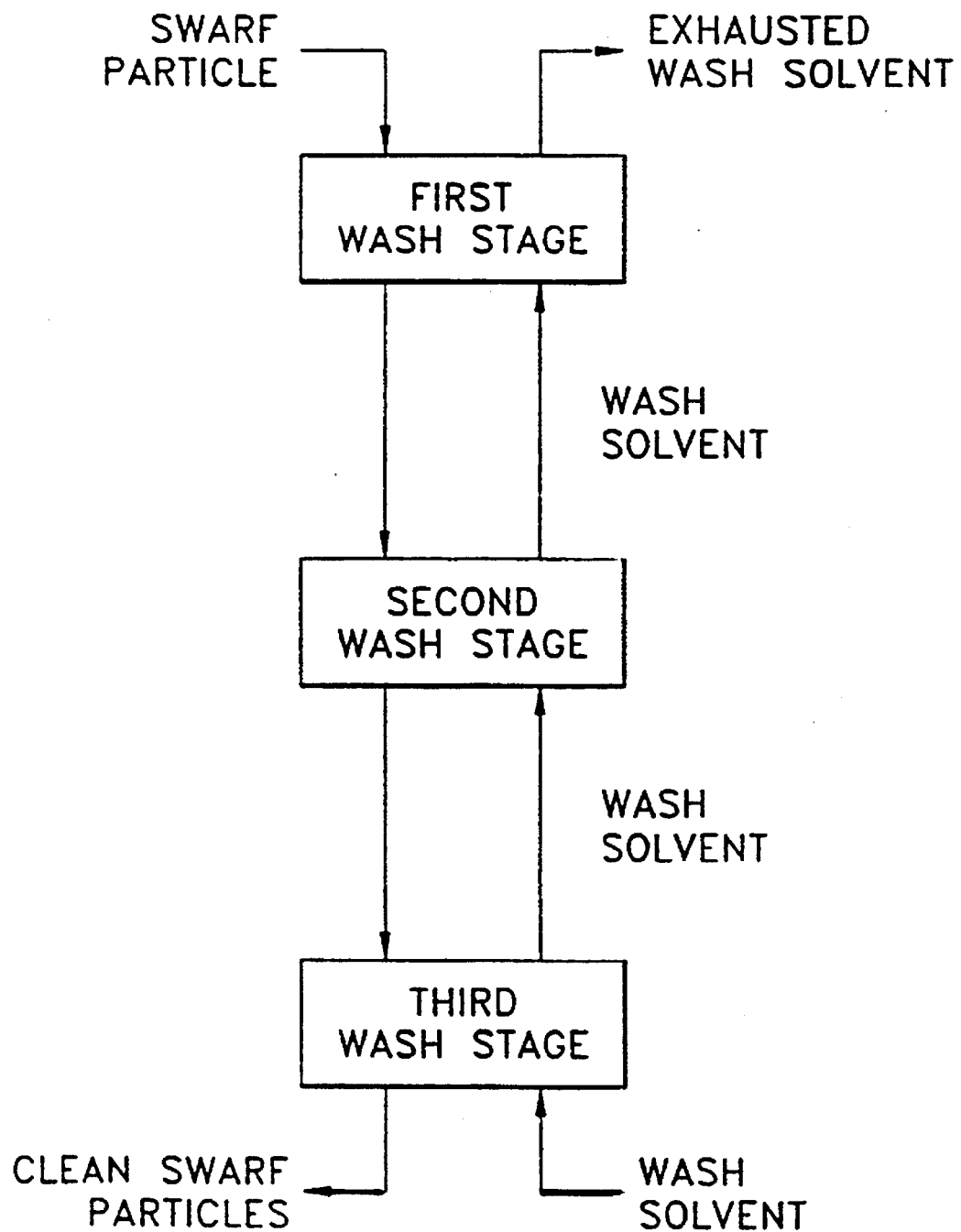
FIG. 4 is a flow sheet showing the counter-current washing step for the process of FIGS. 2, 3 and 5.

The comminuted SWARF, after separation from the displacement wash fluid, can be counter-current washed as described infra with regard to FIG. 4. The clean SWARF particles can be treated as described below to produce sintered SWARF briquettes or dried SWARF/salt briquettes.

Figure 3:
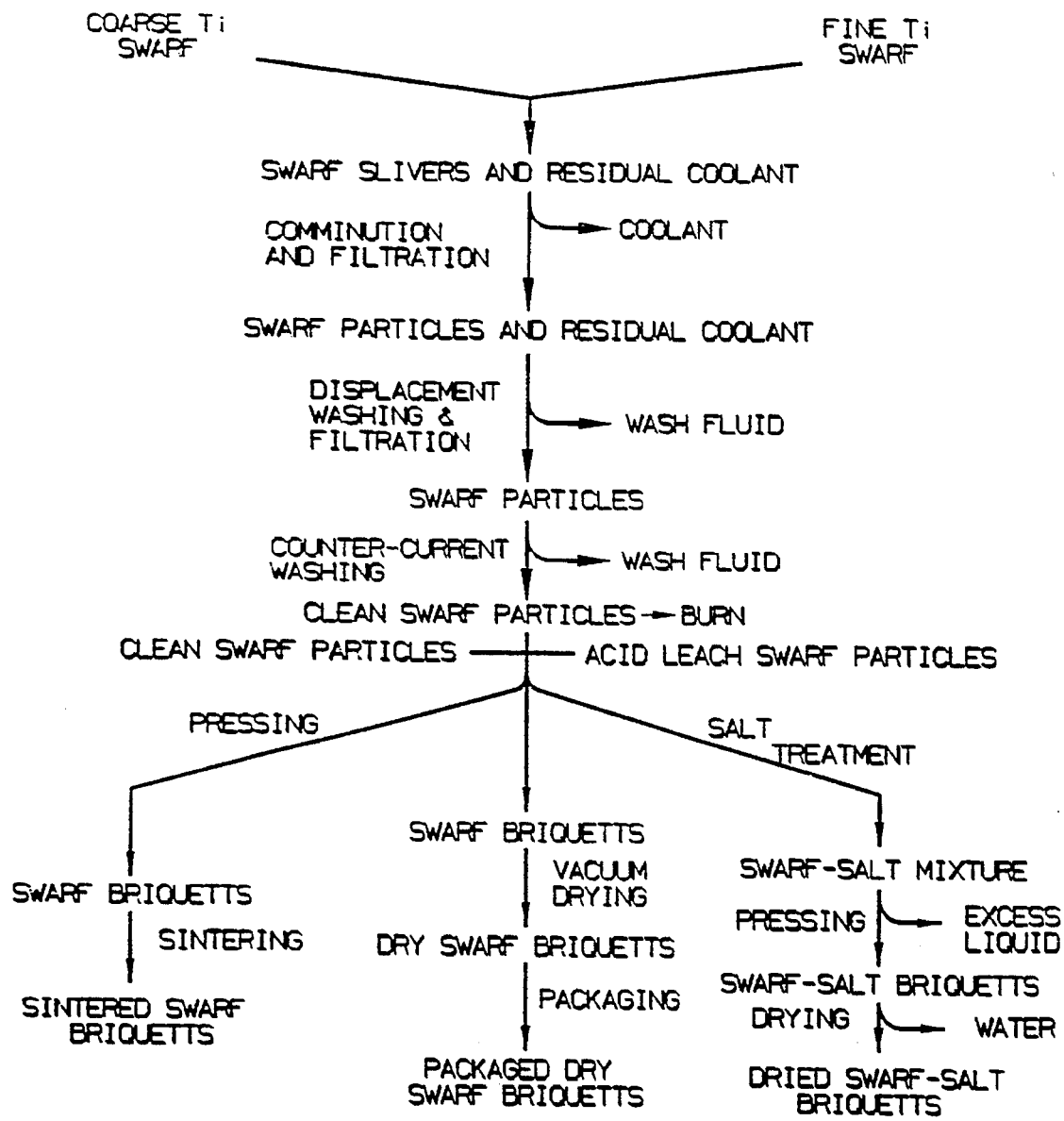
FIG. 3 is a flow sheet showing a process of the present invention for treating SWARF.

Referring to FIG. 3, in the process of the present invention, the SWARF fines after separation from the excess coolant are combined with the coarse SWARF and subjected to a comminution operation where the elongated slivers of refractory metal are broken up into shorter rods. This operation is conveniently carried out with an intensive mixer, such as a Morehouse—Cowles Direct Drive Disperser.

The average aspect ratio of the SWARF particles as produced in the grinding operation is from 20:1 to 200:1. An intensive mixer can readily reduce the aspect ratio below 5:1. This operation results in a considerable change in the bulk density of the SWARF by increasing the packing volume. Whereas the SWARF as produced has a bulk density similar to steel wool or a Brillo Pad, the comminuted SWARF has a bulk density on the order of about 0.3 g/cc and assumes the characteristics of a metal sludge. This order of magnitude change in bulk density greatly facilitates the safe storage and shipping of the material, and as described below, the recovery of coolant therefrom.

When the SWARF is in the low bulk density state, it can hold up to twice its weight of coolant without having any free liquid. In this state, it acts like a sponge. To cover SWARF in this form, it takes about ten times its weight in water or coolant. When the SWARF is comminuted, a substantial portion of the adherent coolant is released.

Once the SWARF has been converted to the high density form as described above and drained of the freed adherent coolant, the retained coolant is about 40% by weight of the metal. Thus over 70% of the coolant which is otherwise lost with the SWARF under existing practice can be recovered and recycled to the grinding operation if the recovered coolant is not a coolant mix of two or more coolant formulations. An additional amount of coolant, 15% by weight of the metal, can be recovered by displacement and counter-current washing of the comminuted SWARF. Saving in the cost of coolant is significant and can justify the processing of the SWARF, however, the comminuted SWARF has other advantages. First, it has much higher bulk density reducing the cost of storage and shipping. Second, much less water is necessary to cover the SWARF to eliminate the fire hazard.

After comminuting the SWARF, it is preferably further processed in several wash steps in series, which removes the organic matter and inorganic salts, such as nitrate or phosphate salts, that are common components of the coolant used in the conventional grinding operations. If not washed off, the coolant presents a major source of oxygen, nitrogen, and carbon in the SWARF product. Washing also tends to remove some of the grinding media or grit which has disengaged itself from the belt during the grinding process. The washing is conveniently done with water although aqueous solutions, organic solvents and the like can be used.

The comminuted SWARF is first washed with a displacement wash of water. The comminuted SWARF is separated from the displacement wash water, usually by filtration. This wash step is normally carried out in the filtration apparatus. Surprisingly, the filtrate is similar to undiluted coolant with respect to composition and concentration and can be recycled to the grinding operation if the recovered coolant is not a mix of two or more coolant formulations.

The counter-current wash is carried out in at least three (3) stages. Referring to FIG. 4, the SWARF particles from the displacement wash is passed to the first wash stage wherein the SWARF particles are washed with the wash solvent from the second wash stage. Preferably the washing in each stage is intensive to remove contamination entrapped in the SWARF matrix and the SWARF slivers. The SWARF particles are separated from the wash solvent and passed to the second stage where the particles are washed with wash solvent from the third stage. The wash solvent from the third stage can be disposed of in an environmentally sound way or, preferably, it can be passed to the displacement wash stage wherein it is used as the displacement wash. After the SWARF particles are washed in the second wash stage, the particles are separated from the wash solvent and passed to the third wash stage where the particles are washed with fresh wash solvent. The wash solvent from the second wash stage is passed to the first wash stage. After the particles are washed in the third wash stage, the clean SWARF particles are separated from the wash solvent and burned as waste material or, preferably, pressed into briquettes and sintered, or mixed with an alkali metal halide salt type, pressed into briquettes and dried. The wash solvent from the third wash stage is passed to the second wash stage.

In counter-current washing, the SWARF particles as they are cleaned from stage to stage are washed with cleaner solvent. This type of washing substantially removes coolant components from the SWARF.

Following the washing process, it is necessary to insure that all of the SWARF remains wet to prevent fire. The wet SWARF is preferably mixed with refractory metal alkali metal fluoride salts in ratios consistent with the ratios of refractory metal in the master alloy. For example, if the master alloy contains 5% by weight titanium and 2% by weight boron, the salt mixture would be formulated to have a 5:2 weight ratio of titanium and boron. For making aluminum-titanium or aluminum-titanium-boron master alloys as an end product, then potassium titanium fluoride, potassium boron fluoride, and titanium SWARF are mixed in ratios appropriate to the end product, as will be explained.

An analogous mixture can be made to produce aluminum-zirconium, magnesium-zirconium, iron-titanium, and iron-zirconium master alloys. For preparation of magnesium-zirconium master alloys, mixtures of potassium zirconium fluoride or sodium zirconium fluoride and zirconium SWARF are useful. For producing products requiring the refractory metal component only, mixture of the SWARF with potassium aluminum fluoride for the aluminum master alloy manufacturing process has been found effective.

Both alkali metal refractory metal fluoride salts and bulk refractory metal, usually in the form of sponge or scrap, is available for use with the SWARF. The instant process permits the heretofore unused SWARF to be used in the alloy industry as a getter for $O_2$, $N_2$ and C and as a grain refiner.

The SWARF is mixed with the alkali metal refractory metal fluoride salts with sufficient mixing to insure that the surfaces of the SWARF, which are quite extensive due to the small average size of the SWARF, are completely wetted with the salt. The wet, alkali metal refractory metal fluoride salt-laden SWARF is then preferably compressed to a convenient size. High compressive forces should be used, such as 5000 pounds per square inch (psi) or more. Preferably the briquettes are compressed at a sufficient pressure to 'set' the compacted SWARF particles and form briquettes having a density near the density of metal melt which the briquettes are to be used in. If the briquettes are compressed at insufficient pressure, the SWARF particles are not sufficiently set in their compacted configurations and the resulting briquettes are loose and easily come apart. When the particles are sufficiently compacted to set the SWARF particles, the briquettes are firm and consolidated. The wet SWARF alkali refractory metal fluoride mixture may be compacted with conventional equipment. Useful devices include die and mold presses, briquettes, and corrugated and smooth roll presses, and the like. This step squeezes out much of the wash water from the SWARF/salt mixture. Once compressed, the briquette has some structural integrity due to the deformation and interlocking of the SWARF particles with each other.

The compressed SWARF/salt mixture forms a SWARF/salt compacted mass unit which is preferably dried. The compacted mixture can be dried in conventional equipment, such as tray driers, belt driers, etc. Preferably, the compressed SWARF/salt mixture is dried in a vacuum dryer with indirect heating, such as steam coils. Although a direct flame is preferably avoided, an indirect flame can be used to dry as the compacted SWARF/salt mixture is not flammable if it has 23% by weight salt on a dry basis and will not sustain combustion even if heated to red heat under a torch. For SWARF/salt compacted mass units having less than 23% by weight salt on a dry basis, burning may occur, but at a slow, controllable rate. The drying in conventional equipment is heat transfer limited and no "bound water" or "difficult to remove water" is observed. As the SWARF dries, water leaving the mass unit leaves a salt residue. Since surface tension acts to cause collection of the liquids at points of closest contact between the individual pieces of metal SWARF, the evaporation of the water leaves salt "bridges" attached to the closest points of metal. Salt bridging between very close points of contact form sturdy bonds. Therefore, these "salt bridges" strengthen the compressed briquettes.

The SWARF can be mixed with salt over a wide weight range, such as from 1:2 to 9:1 SWARF:salt on a dry basis. The upper limitation for salt appears to be when the salt content interferes with the structural integrity of the SWARF/salt compacted mass unit and renders it friable or easily broken. The lower limit for the salt content appears to be when the salt present is insufficient to prevent rapid ignition or combustion of the SWARF/salt compacted mass unit. Ten percent salt by weight of the mass unit appears to be around the lower limit.

The SWARF/salt compacted mass unit is surprisingly superior in practice to the commonly used sponge or scrap in master alloys. It dissolves more readily and in higher yield into the molten metal and is more reactive with the other components of a master alloy, for example, boron.

The SWARF/salt compacted mass unit having at least 30% by weight salt is also surprisingly flame resistant and therefore safely handled and stored in air. The substantial and surprising degree to which the admixture of alkali metal refractory metal fluorides salt and SWARF suppress flammability appears to be due to several factors.

First, the alkali refractory metal fluorides arrest the flame propagation reactions in combustion processes. The fluoride in the alkali metal fluoride salts and the alkali metal refractory metal fluoride salts suppresses free radical generation which is an important reaction in the combustion process. Some refractory metal fluoride compounds have, in the past, been used as fire retardants in clothing.

Secondly, the alkali metal refractory metal and alkali metal aluminum fluoride salts mentioned above have melting points at around 650° C., or just below the temperature at which titanium and zirconium allow rapid diffusion of oxygen necessary to sustain combustion. The highly endothermic melting process of the alkali metal refractory metal fluoride salts removes heat from the SWARF, as the salts melt at just below the combustion temperature of the SWARF metal.

Thirdly, once melted, the molten alkali metal refractory metal fluoride salt strongly wets the surface of the SWARF metal with a molten salt film that severely limits transport of oxygen and nitrogen to the metal to support combustion.

Fourthly, the molten alkali metal refractory metal fluoride salt forms a molten film which fills void spaces in the SWARF/salt compacted mass unit which would otherwise transport air to the interior of the compact and to those sites inside the briquette which would otherwise have the air metal mixture appropriate for reaction.

Table salt, NaCl, or any other alkali metal halide salt, such as potassium chloride, potassium fluoride, may be added to the wet SWARF/salt mixture prior to pressing to enhance the economics of the resulting mixture since such salts are cheaper than the refractory metal salt and can assist in the reduction of the vapor pressure over the aluminum refractory metal alloy melt during the addition of the SWARF/salt compacted mass unit. In one embodiment, two (2) moles of potassium chloride are added for each mole of potassium fluotitanate. As can be deduced from the mechanisms outlined above, the addition of an alkali metal non-refractory metal halide salt will assist in accomplishing some of the above objectives. Although sodium chloride melts at about 801° C., and potassium chloride melts at about 776° C., slightly above the temperature where the refractory metals allow rapid diffusion of oxygen, the presence of these salts still acts to retard refractory metal combustion particularly as a eutectic of the alkali metal halide and alkali metal refractory metal halide salt mixture which melts at a lower temperature than either salt.

Where the manufacture of refractory metal-boron master alloys is of importance, the alkali metal refractory metal fluoride salt may be mixed in proportion with an alkali metal fluoro borate salt. In this manner, the boron is more easily added to the master alloy, and it serves to reduce the flammability of the SWARF compacted mass unit, along with the alkali metal refractory metal fluoride salt. For example, potassium fluoroborate has a melting point of about 350° C., and would similarly melt below the temperature at which oxygen diffusion into the SWARF metal takes place. The melting of the potassium fluoroborate would begin to pull any other salts present into its molten solution early on, and thus perform some of the above factors in an accelerated manner. The addition of potassium titanium fluoride, potassium boron fluoride, and/or potassium zirconium fluoride, optionally with potassium fluoride, an intimate mixture is preferred for preparation of aluminum master alloys.

Once the SWARF/salt compacted mass unit is dried, it can be used in the production of alloys, master alloys and/or re-alloying refractory metal. This unexpected result occurs despite the fact that raw, refractory metal with clean surfaces does not normally readily dissolve when added to the alloy, master alloy or metal molten mass. The salt rises to the top of the master alloy molten mass and is easily drawn off. It appears the salt "fluxes" the dissolution of the refractory metal SWARF with the molten aluminum.

In another embodiment of the present invention, the clean SWARF particles can be sintered. Once the SWARF is washed, it can be compacted and dried without salt addition. The SWARF particles are compacted at elevated pressures, such as, at a pressure of 5,000 psi, preferably higher, such as 20,000 psi. It may be heated rapidly and briefly to between about 950° C. and 1100° C. to cause sintering. Sintering causes some of the individual pieces of the SWARF compacted unit mass to become bonded to each other to form a mass having an even higher integrity than the SWARF/salt compacted unit mass. In addition, the surface area of the SWARF is highly reduced during sintering. Sintering at 1000° C. for four hours is sufficient. However, temperatures between 950° C. and 1100° C. can be used to sinter the SWARF compacted mass unit. The sintering is done under vacuum in an inert gas atmosphere, such as under argon or helium. The resulting refractory metal sintered SWARF briquettes can be used in refractory metal metallurgy.

Figure 5:
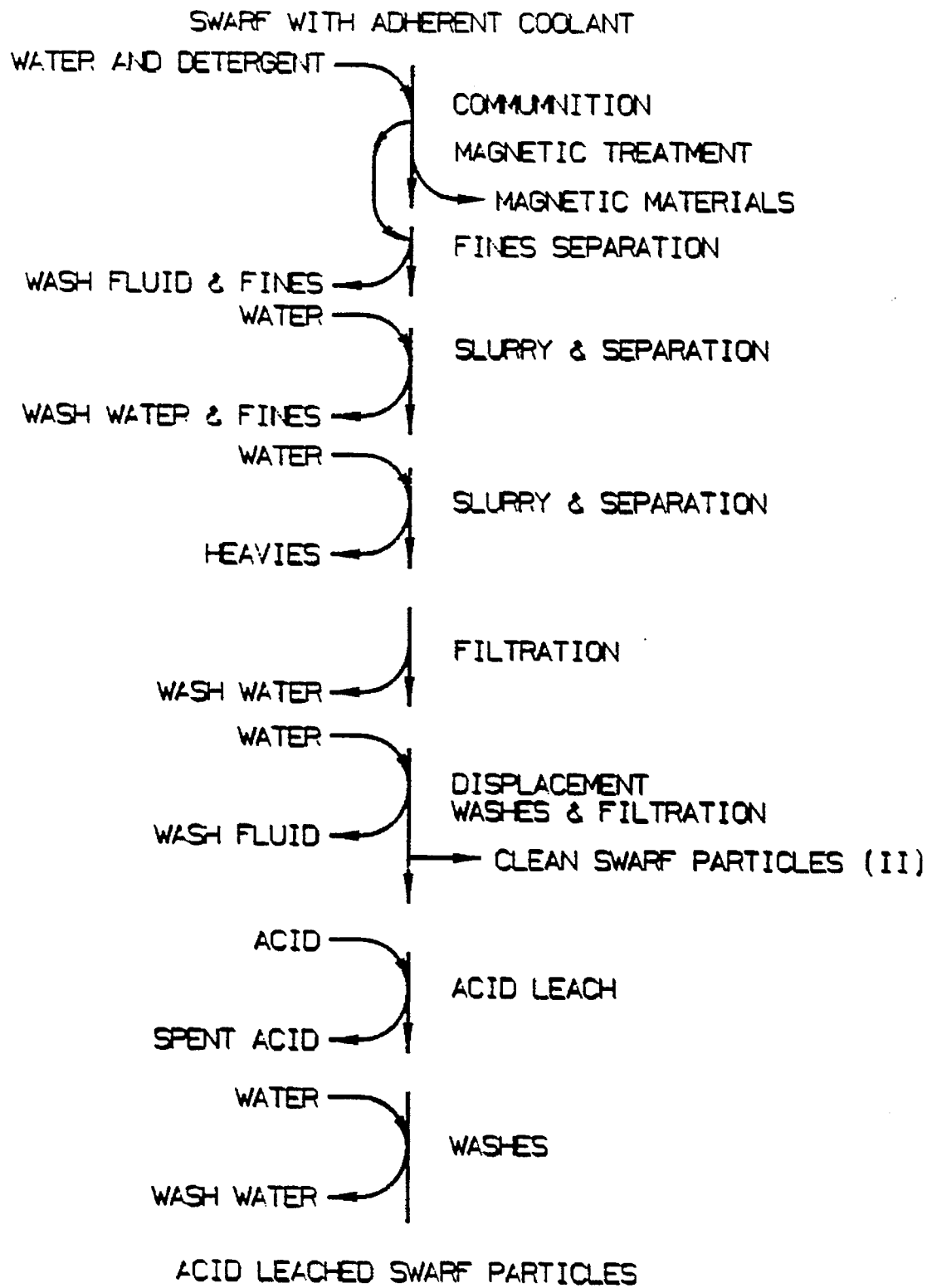
FIG. 5 is a flow sheet showing an alternative embodiment of the present invention for producing clean SWARF particles.

Referring to FIG. 5, an alternate embodiment of the present invention is illustrated. SWARF with adherent coolant which is a product of the SWARF fines with the excess coolant removed and combined with the coarse SWARF as described above, is combined with an aqueous detergent and comminuted with a high intensity mixer, such as the Morehouse—Cowles Direct Drive Disperser in a mixer tank. The comminution operation reduces the average aspect ratio of the SWARF particles to below 5:1 described above. Preferably, the SWARF is mixed with a water and detergent mixture prior to comminution. The water and detergent mixture aids in cleaning the coolant off the surface of the SWARF particles. The amount of water and detergent mixture added is not critical, but preferably enough water and detergent are added to cover the SWARF prior to comminution. If the SWARF contains iron or other magnetic material impurities, during the comminution step, magnetic rods or bars can be inserted into the comminution tank to remove the magnetic particles. From time to time during the comminution, the magnetic rods or bars are withdrawn and the magnetic material is wiped off the rods and bars. The rods and bars are then re-immerse into the comminution mix. This step is repeated until the magnetic bars or rods no longer collect magnetic material which indicates that substantially all the magnetic particles have been removed. During the comminution step, the intensive mixer breaks up the SWARF particles and breaks off fine refractory metal oxides, nitrides and carbides that form on the surface of the SWARF material. After the comminution step is complete and the magnetic treatment carried out, which is only carried out if magnetic material is present, the comminution is stopped and the mix is allowed to settle for a minute or two. During the comminution step, the immersion of a magnet into the comminution slurry will quickly pick up particles of magnetic material if such material is present. Thus the magnets can be used to 'test' for magnetic particles in the SWARF. The aqueous slurry containing the refractory metal fines is decanted off. The decanted floating slurry comprises the wash fluid, a mixture of the coolant water and the detergent, and the hard refractory metal fines comprising principally refractory metal oxides, nitrides and/or carbides.

After the separation by decantation, the tank is recharged with water and the mixing action is commenced again to form a slurry. This step only takes a minute or two. After the mixture has slurried up, the mixer is stopped and the mix is allowed to settle for a minute or two. The aqueous slurry is decanted off leaving a heavy wet residual at the bottom of the tank comprising primarily of clean SWARF particles. The decanted slurry comprises primarily wash water contaminated with a slight amount of detergent and coolant, and some refractory metal fines comprising primarily of refractory metal oxides, nitrides and/or carbides. The tank is preferably charged with water again and once again slurried by starting up the mixer for a brief period of time. The slurry is promptly pumped out of the tank before it has had an opportunity to settle. An additional charge of water may be added or needed to insure that all the clean SWARF is slurried and pumped out of the tank. If there are any heavy non-refractory metal materials in the initial charge of SWARF, such as metal bolts or nuts or the like, they will remain in the bottom of the tank since they will be too heavy to remain in the slurry and it will be too heavy to be drawn up into the pump. These heavy materials can be hand removed from the tank.

The pumped slurry material is sent to a filter where the slurry water is filtered off. The filtered SWARF particles are displacement washed on the filter with preferably at least three (3) displacement volumes of water to thoroughly clean off the SWARF material. The clean SWARF particles at this point can be burned as described above, pressed and sintered as described above, or formed into dried SWARF/salt briquettes as described above, or pressed and packaged as herein described.

In an alternative embodiment of the present invention, the clean SWARF particles are pressed as described above to form SWARF briquettes. Preferably the SWARF particles are pressed at a sufficient pressure to give the SWARF briquettes a density approximating the density of the alloy, master alloy or metal melt that the briquette will be utilized in. For example, titanium SWARF briquettes for use in aluminum melts are compacted to a density of about 2.82, the density of molten aluminum. A compaction pressure of about 20,000 psi will produce compact titanium SWARF briquettes with a density of about 2.82. When the briquette has a density about equal to the density of the melt, the briquette submerges easily into the surface of the melt and minimizes contact between air and the SWARF refractory metal in the briquette which approaches the temperature of the melt and increases the oxidation rate of the refractory metal.

Rather than sintering the briquettes, the briquettes can be vacuumed dried to remove moisture to 0.05% moisture or less. Preferably the vacuum dryer is indirectly heated. The briquettes can also be fully wetted with water. Fully wetted means saturated with water but drop free. After the drying or wetting operation, the SWARF briquettes are packaged to form a wrapped or coated dry SWARF briquettes. The briquettes can be packaged individually or in packages of two (2) or more briquettes. Conveniently, the briquettes can be packaged into a roll of 5 briquettes. The briquettes can be packaged with a variety of materials to protect the SWARF from environmental effects. Conveniently, the SWARF briquettes can be wrapped in aluminum foil, such as kitchen grade two (2) mil aluminum foil. Preferably the free ends of the foil wrapping are folded over at least twice to form a relatively good seal with the packaging material. The briquettes also can be wrapped with wax paper or plastic films, such as Saran wrap brand plastic film, cellophane brand wrapping film, polyethylene film or polypropylene film and the like. Optionally, the briquettes can be dipped or sprayed with a coating material, such as a pigment-free lacquer, varnish, polyurethane, paraffin wax, or other protective coating. Preferably these coatings will be pigment free coatings so as not to contaminate the SWARF. Wet briquettes are dipped or sprayed with water compatible coating material. Although a variety of wrapping material and coatings can be used, it appears that when the SWARF briquettes are to be used in a refractory metal aluminum alloy or master alloy, the aluminum foil wrapping material appears to be the material of choice for packaging the briquettes.

The wrapping material or coating material for the dried briquettes accomplishes several objectives. The packaging minimizes the reaction of the clean SWARF surface with oxygen and nitrogen. The packaging keep wetted briquettes wet—partially dry briquettes can be a fire hazard because of the reaction of refractory metal with water in the presence of oxygen to form hydrogen and refractory metal oxide. This reaction is minimized with dry or fully wet briquettes. The packaging also prevents small SWARF particles from breaking loose from the briquette. The small SWARF particles when separated from the briquettes, are much more reactive and can be more quickly heated than particles in a briquette. Thus, the individual particles are far more dangerous and far more likely to self ignite than the particles in a briquette. By wrapping or coating the briquette, the particles are kept with the briquette and are not allowed to fall off or fall out of the briquette. The packaging also functions as a spark protector for the briquette against a spark initiating from the briquette or from landing into the mass of SWARF particles making up the briquette. A spark will have very little effect on the above wrapping materials and coating materials, but a spark can ignite on a single particle of SWARF. The packaging is also sparkless, that is, the wrapped or coated briquette will not create a spark if impacted against iron, flint, etc.

After the briquettes are packaged, they are boxed. For purposes of this invention, the term "packaged briquettes" and "packaged formed body of refractory metal" will mean wrapped or coated dried refractory metal briquettes. It is envisioned that the briquettes will be boxed in amounts of from twenty-five (25) to fifty (50) one pound briquettes per box. However lighter or heavier briquettes may be made and supplied in larger or smaller boxes, bags, drums, bunches, tubes and the like.

Wet SWARF briquettes are dried, such as in a vacuum dryer, to 0.05% moisture or less before the briquette is added to molten metal or molten metal alloy. Hot SWARF vigorously reacts with water as described above.

Referring again to FIG. 3, there may be instances where the SWARF surface has embedded small iron particles that are not freed during the comminution and thus are not captured by the magnetic separation. Optionally, such SWARF can be treated with an acid leach to dissolve out the magnetic material and leave the refractory metal SWARF. Conveniently, the SWARF can be leached with 10% hydrochloric acid. After the leaching operation which normally only takes about a half-hour at a slightly elevated temperature, such as a temperature of 100° F. or higher, the acid leach solution is filtered off the SWARF particles and the SWARF particles are washed with water to remove all the acid and the metal acid salts formed by the acid leach. The acid leach SWARF particles can be further processed in the same manner as the clean SWARF particles. That is, the clean SWARF particles can be burned, they can be pressed and sintered, they can be formed into dried SWARF/salt briquettes or they can be pressed and formed into dry SWARF packaged briquettes.

The materials separated from the magnetic rods or bars by the wiping operation contain an appreciable amounts of refractory metal SWARF particles. This material can be recycled back into the comminution steps to further separate the magnetic material from the SWARF particles or alternatively, this separated magnetic material can be treated to an acid leach step similar to the acid leach step described above to remove magnetic materials. The separated magnetic material is treated with a dilute mineral acid, such as 10% hydrochloric acid at a moderately elevated temperature, such as 100° F., for about a half-hour to leach out the iron and other magnetic material and form iron chloride and other metal chloride salts. The refractory metal is resistant to the acid leach. After the leaching operation, the acid is filtered off the refractory metal slurry and the solids are treated to displacement washes on the filter to obtain clean refractory metal particles. These SWARF particles can then be returned to the comminution operation to further complete the cleaning operation.

Traditional sources of refractory metal scrap for the aluminum, magnesium and iron alloying markets have been affected by the introduction of electron beam and plasma beam melting. Previously titanium and zirconium turnings, edge trims, and various other forms produced during the conversion of ingot to finished parts for the aerospace and nuclear markets had high enough impurity inclusion levels to restrict their use as recycle materials. These materials were sold to the alloy markets. Processing these materials in a plasma or electron beam furnace eliminates inclusions and allows them to be recycled to high quality consolidated refractory metal which commands a higher price than the traditional scrap markets. Thus the cost of refractory metal feed materials for the alloy market has risen. The refractory metal sintered SWARF briquettes can be used as feed material in such processes.

Although the process steps disclosed herein are generally applicable to refractory metal SWARF processing, the specific examples given below outline the range of application.

In any operation involving the handling or processing of titanium or zirconium SWARF, safety is a paramount concern. SWARF is classified as a hazardous material, by virtue of its flammability. Flammability of dry titanium SWARF is an important consideration in the design of any recovery process. Although the flammability characteristics of SWARF has not been specifically studied, some data has been accumulated on titanium powders by the U.S. Bureau of Mines and is summarized in the following paragraphs.

Like many metal powders, titanium is capable of forming explosive mixtures with air. The ignition temperature of titanium dust clouds formed in laboratory equipment with different samples of powder ranged from 330° C. to 590° C. The minimum explosive concentration determined in tests was 0.045 ounces/cubic foot. Measurements of maximum pressure produced in explosions of powder in a closed bomb at a concentration of 0.5 oz/cu ft. ranged from 46 to 81 lb/sq in. The average rate of pressure rise in the explosion tests was 250 to 3400 lb/sq in/sec and the maximum rate of pressure rise was 550 to 10,000 lb/sq in/sec. The minimum energy of electrical condenser discharge sparks required for ignition of a dust cloud was 10 millijoules and for an undispersed dust layer the minimum value was 8 microjoules. Some samples of titanium powder could be ignited by electric sparks in pure carbon dioxide as well as in air. At elevated temperatures in some cases titanium was found to react in nitrogen as well as in carbon dioxide.[1]

[1] U. S. Bureau of Mines. RI3722, RI4835.

Titanium powder in the form of sludge or in a wet condition can be dried safely in a vacuum drier at a temperature not exceeding 110° C. Mixing or blending of dry powder should be done in an inert atmosphere. Tests indicate that the maximum values of oxygen allowed when using different inert gases to prevent explosion of titanium dust are given in TABLE I.

TABLE I

| | |
|---|---|
| Carbon Dioxide | 0% Oxygen |
| Nitrogen | 6% Oxygen |
| Argon | 4% Oxygen |
| Helium | 8% Oxygen |

Heretofore, SWARF had been labeled as too contaminated to be useful in the metal alloy market. The oxidation of the SWARF slivers by air during their removal in the grinding operation and observation of the tendency of SWARF, even when compacted, to float on top of molten aluminum, magnesium, and iron baths and further oxidize, strengthened this belief. Chemical analysis of the SWARF usually showed it to be high in oxygen, nitrogen, and carbon. Surprisingly, the present inventor found that if sufficient coolant was used during the grinding step, that the SWARF slivers themselves remained substantially free from oxygen, carbon, and nitrogen contamination, and that the SWARF could be freed from the majority of contamination by these elements by washing the coolant off the SWARF with water. By using the process disclosed herein, the coolant could be economically recovered for reuse. The cleaned SWARF could be consolidated for use in alloying markets.

EXAMPLE 1

Eight hundred grams of as-produced titanium SWARF, having the consistency of steel wool from a sheet grinding operation in which all of the free moisture was drained, was placed in a food processor with a chopping blade turning at 3600 RPM to comminute the material. In two minutes the SWARF was converted from a low bulk density steel wool-like material to a metal particle slurry. The liquid in the slurry had been entrained in the well-drained SWARF even though it appeared to be reasonably dry. Separate drying tests showed pre-comminuted SWARF to contain 66% volatiles indicating even more coolant is present since the coolant was only 94% water and the coolant additives were non-volatiles.

After the comminuted SWARF slurry had settled, 350 grams of coolant was drained off, having been liberated or freed by the comminution. The remaining SWARF slurry (440 grams) was placed in a Buchner filter and given a displacement wash which removed an additional 116 grams of the coolant. The coolant was removed at essentially full strength and was suitable for recycle to the grinding operation. The remaining SWARF was then intensively washed with two liters of distilled water. The analysis of the as produced titanium SWARF which was dried at 110° C. and the comminuted, washed SWARF which was dried at 110° C. is shown in the following Table II.

TABLE II

| | AS PRODUCED SWARF | CLEANED SWARF |
|---|---|---|
| Percent Ti | 96.4% | 99.7% |
| Percent Si | 0.45% | 0.12% |
| Percent C | 0.85% | 0.16% |
| Percent O | 1.9% | 0.38% |
| Percent N | 0.42% | 0.026% |

These data show that the majority of contamination in SWARF produced with plenty of coolant, can be removed by comminuting and washing with water.

EXAMPLE 2

The wet, washed titanium SWARF obtained from Example 1 was divided into four samples. Separate samples were mixed with 10%, 30% or 50% by weight of wet (about 15% moisture) potassium titanium fluoride and 50% by weight potassium aluminum fluoride. Each sample was compacted into ten pellets each measuring nominally ½" diameter X ½" tall. Ten similar pellets were made of comminuted and washed zirconium SWARF and potassium zirconium fluoride. Blank pellets of both comminuted and washed titanium and zirconium SWARF were also prepared. The pellets were prepared using a Carver press. The compaction into pellets resulted in the expulsion of most of the water in the pellets. The pellets without salt had a residual 15% moisture in the pellet when pressed at 20,000 psi in a ½" diameter die. The pellets with salt addition retained 4–10% moisture depending on the amount of salt in the mixture. The pellets were dried in an oven at 105° C. All of the pellets reached constant weight in thirty minutes and none of the pellets showed any indication of bound water by the shape of the drying curve.

Several of the pellets of each sample were subjected to flame tests which were conducted by holding the pellets in a neutral $O_2$—$C_2H_2$ flame of sufficient intensity to heat a 1"×1"×½" thick steel plate to full red heat in 45 seconds. The test was conducted by placing the test pellet on an 8" wide piece of 316C stainless steel flat bar and pushing it under a fixed torch burning under constant conditions.

Under these conditions, loose, washed and dried titanium and zirconium SWARF ignited immediately in a bright photo flash fashion. Since considerable heat release occurs during the burning process, any significant accumulation of washed and dried SWARF would be extremely dangerous.

Compacts of uncomminuted, washed and dried, zirconium and titanium SWARF ignited on the order of one second and burned in a self-sustaining fashion in about 5 seconds. Compacted, uncomminuted, washed SWARF is a dangerous material in any significant accumulation and must be stored under water.

Both zirconium and titanium pellets with mixed salt were much less flammable. Potassium titanium fluoride with titanium SWARF, potassium aluminum fluoride with titanium SWARF, potassium zirconium fluoride with zirconium SWARF all significantly improved flammability resistance. Pellets containing about 50% by weight salt took about 10 seconds to reach a temperature where reaction with air began to occur as evidenced by the white color in the pellet flame. In this case, combustion would not sustain itself when the torch flame was removed. The 30% by weight salt pellets were borderline in their ability to sustain reaction with air when the torch flame was removed, and those with 10% by weight salt sustained reaction with the torch removed, but burned in a controllable fashion and far less readily than the pellets with no salt. Compacted SWARF/salt pellets, containing at least 10% by weight alkali metal refractory metal halide salt could be stored without a water cover. Preferably the SWARF pellets would contain at least 30% by weight salt.

Zirconium and titanium SWARF pellets with 30% and 50% by weight salt of the types given above, were immersed in molten aluminum at 700° C. and held under the surface with a graphite tool. The pellets readily reacted and dissolved into the molten metal. Similar tests run on SWARF compacts without salt addition tended not to dissolve and would simply rise to the surface of the melt when the graphite tool was raised. The salt obviously helped "flux" the dissolution of refractory metal into the aluminum.

EXAMPLE 3

Several of the titanium and zirconium SWARF pellets prepared in Example 1 without salt were placed in a vacuum furnace and heated to 1000° C. for four hours. The resulting pellets were reduced in volume by about 40% and had a density or 90% of theoretical. These pellets did not sustain combustion in the torch test described above. These pellets did not readily dissolve in aluminum at 700° C. until a layer of potassium titanium fluoride was added to the top of the molten aluminum which led to ready dissolution of the pellets and also reaction of the titanium salt. These pellets have desirable handling characteristics for charging into titanium melting furnaces.

EXAMPLE 4

A visual examination of coarse SWARF shows the material to be highly agglomerated in the form of entangled slivers of titanium metal. The unwashed SWARF has a dull, non-lustrous appearance which is improved by washing. The SWARF sliver length appears to be from about 0.02 millimeters to about 2 or 3 millimeters. The cross sectional dimension appears to be relatively uniform and is estimated to be less than about 0.01 mm in width.

Grains of dark SiC grit are visible under magnification. The grit is dark, lustrous, irregularly shaped but tending to an oblate spheroid. They do not exhibit sharp facets or fracture surfaces. The grit in the SWARF falls roughly into three categories, including (1) Free grit, (2) Grit that is mechanically trapped in the SWARF tangles, and (3) Grit that appears to be bound to the titanium sliver. The SiC grit may be attached to the titanium by a reaction of the titanium with the SiC.

The distinguishing features of fine SWARF and sludge with respect to coarse sludge is simply the particle size and the absence of large SiC particles. Fine SWARF shows no large, discrete particles of SiC grit. Silicon analysis of this material shows appreciable amounts of silicon. Accordingly, the fine SWARF material and sludge apparently contains silicon carbide fines as well as the titanium fines. The fine SWARF and sludge sample particles are at least one order of magnitude and smaller in size than the coarse material.

EXAMPLE 5

A 1,000 gallon tank is filled with the contents of nine (9) 55 gallon drums containing SWARF particles generated by abrasive wheel grinding. The tank is charged with 500 gallons of a water detergent mixture (Calgon dishwashing detergent; fifteen (15) pounds of detergent). The tank is fitted with a Morehouse—Cowles Direct Drive Disperser with a 50 hp motor drive at about 1,200 RPM. The mixer is started and allowed to operate for ten (10) minutes. The mixer blade breaks up the SWARF particles and breaks the surface coatings of hard refractory metal oxides, nitrides and carbides to a fine dust which is easily dispersed in the slurry mixture. The whirling mixing blade has sufficient agitation to entrain the SWARF particles in the aqueous slurry mixture. Larger, heavy materials, like nuts, bolts, cutting tools, and the like, fall to the bottom of the tank. The agitation is not sufficient to slurry these materials and they remain on the bottom and are easily removed by hand after the operation.

During the comminution employing the intensive mixer, a magnetic rod is inserted into the tank to determine if there are any magnetic materials, such as iron in the tank. The magnetic materials are attracted and adhere to the rod, after a minute within the tank, the rod is withdrawn. If there are adhered particles on the rod, the rod is wiped off with a cloth or gloved hand and reinserted into the tank. This operation is continued until the rod remains substantially clean of all particles which indicates that all magnetic particles having a density similar to that of the SWARF particles have been removed from the slurry.

After the intensive mixing has run its course, normally in about ten (10) minutes, the intensive mixer motor is stopped and the slurry is allowed to settle for a minute or two. The aqueous slurry is then decanted off. The decanted aqueous slurry comprises principally of water, detergent, coolant and fine hard particles of refractory metal oxides, nitrides and/or carbides. After the decantation step, the tank is charged with a fresh charge of clean water (approximately 500 gallons) and the intensive mixing action is commenced again for a minute or two. The intensive mixer is stopped, the aqueous slurry is allowed to settle for two (2) minutes and then the aqueous slurry is decanted off leaving a residual at the bottom of the tank comprising principally of clean SWARF particles. The aqueous slurry decanted off contains principally water, a very small amount of detergent and coolant and fine hard fines refractory metal oxides, nitrides and/or carbides.

The tank is charged a third time with clean water and the intensive mixer is started up again and allowed to run for one (1) minute. After the mixer is stopped, the aqueous slurry is pumped out of the tank and on to a filter. After all the aqueous material is pumped out of the tank, the tank is charged a fourth time with fresh, clean water, the intensive mixer is run again and the aqueous slurry is pumped out of the tank. The intensive mixture is turned off when the slurry level falls below the mixer blade. This operation substantially removes all the clean SWARF particles from the tank. If there are any heavy metal particles in the initial SWARF, such as iron or steel bolts, nuts, tool, tool parts or the like, they will remain in the bottom of the tank and can be clean out of the tank by hand. On the filter, the pumped slurry is filtered and washed three (3) times on the filter with equal volumes of water to leave clean SWARF particles on the filter.

The wet, clean SWARF particles are removed from the filter and pressed at 25,000 psi in a press to produce SWARF briquettes measuring 1½ inches in thickness and about 3½ inches in diameter. Each briquette weighs approximately one (1) pound dry. A charge of several hundred wet briquettes are placed in a sealed vacuum dryer which is indirectly heated with steam coils at approximately 300° F. The dryer is evacuated under vacuum to about ten Torrs or less and the briquettes are dried over a period of several hours to a moisture content of less than 0.05%. The briquettes are allowed to cool down, under vacuum, in the dryer until they reach ambient temperature. The briquettes are removed from the dryer and each is wrapped individually in aluminum foil, the ends of the aluminum foil being folded over twice. The wrapped briquettes are packed into cardboard boxes, 48 briquettes per box.

EXAMPLE 6

The tank of Example 5 is charged with the contents of nine (9) 55 gallon drums containing titanium SWARF particles produced by stone grinding. The SWARF contains about 5% iron particles. The tank is charged with 500 gallons of an aqueous detergent mixture and the resulting mixture is comminuted in the tank using the intensive mixer. During the comminution step, a highly magnetic rare earth oxide magnet rod measuring ½ inch by 3 feet, manufactured by Ford Motor Company, is inserted into the tank for about 30 seconds and then withdrawn. The rod is covered with magnetic metallic particles. The rod is wiped clean with a gloved hand and inserted back into the agitated tank. This step is repeated until the rod no longer picks up magnetic metallic particles. The magnetic treatment lowers the iron content of the slurry to less than 1/10%. The comminuted slurry following the magnetic treatment is treated in the same manner as the SWARF particles of Example 5 to yield clean SWARF particles.

EXAMPLE 7

The clean SWARF particles of Example 6 in the undried state are compacted at 20,000 psi in a press to produce one pound wet briquettes having a density of about 2.8 grams per cc. The briquettes are fully wetted with clean water and packaged as a roll of 5 briquettes with 4 mil. aluminum foil. Ten rolls (50 briquettes total) are boxed together in a moisture barrier box to keep the packaged briquettes wet. Before the briquettes are added to a molten metal melt, the briquettes are dried under vacuum to a moisture content of at least 0.05% or less.

EXAMPLE 8

The clean SWARF particles of Example 6 are added to an acid leach tank containing 10% hydrochloric acid. The slurry is agitated for ½ hour at a temperature of approximately 120° F. The agitation is stopped, the slurry is allowed to settle and the leach liquor is decanted off the leach tank. The residual SWARF particles remaining in the tank are mixed with water, slurried and pumped to a filter as a slurry. The charge of SWARF on the filter, after filtration of the water, is washed three (3) times on the filter with equal displacements of wash water to yield clean acid leached SWARF particles which are virtually free of iron. The acid leach SWARF particles can be utilized to produce the wrapped briquettes of Examples 5 or 6, the SWARF pellets of Example 2 or the sintered SWARF pellets of Example 3.

EXAMPLE 9

The separated magnetic metallic particles of Example 6 wiped off the magnetic rod are inserted into the comminution tank of Example 6. These particles contain 25 to 40% iron with the balance being titanium. These particles are treated in the same manner as unprocessed titanium SWARF to recover the titanium particles and separate the magnetic metallic particles. Alternatively, these particles can be treated to the acid leach step of Example 7 to dissolve out the iron leaving the titanium particles. The leach step is carried out by using at least a stoichiometric amount of dilute hydrochloric acid, such as 10% hydrochloric acid, at an elevated temperature, such as 110° F., for a sufficient period to cause a dissolution of iron into iron chloride salts. After the leaching step, the remaining titanium particles can be recycled back into the process of Examples 1, 5 or 6 to thoroughly clean the titanium particles as described herein.

EXAMPLE 10

The clean SWARF particles of Example 8 are compacted at 20,000 psi in a press to produce 5 pound briquettes measuring 2½ inches thick and 5 inches in diameter. The briquettes are fully wetted with water and packaged in polyethylene film (3 mil). Ten packaged briquettes are boxed in a moisture proof box.

What is claimed is:

1. An improved process for producing refractory metal SWARF substantially free of oxide and nitride impurities wherein the SWARF is produced by grinding a refractory metal with an abrasive tool to grind off surfaces of the refractory metal thus producing SWARF, the improvement comprising performing the grinding operating with sufficient grinding fluid so that the grinding fluid does not reach its boiling point temperature to prevent the produced SWARF from being heated to a temperature of 650° C. or more.

2. A process for converting refractory metal SWARF into clean SWARF particles substantially free from coolant components used during the production of SWARF, comprising the steps of:

comminuting refractory metal SWARF slivers containing entrained residual coolant, in an intensive mixer to break up the refractory metal SWARF slivers into comminuted refractory metal SWARF particles and fracture and separate refractory metal oxides, nitrides and carbides from the refractory metal SWARF slivers and particles and to free a portion of the residual coolant entrained in the refractory metal SWARF;

separating the comminuted refractory metal SWARF particles from the freed residual coolant; and washing the comminuted refractory metal SWARF particles with water to yield clean SWARF particles.

3. The process according to claim 2 wherein the washing of the comminuted SWARF particles comprises that at least one displacement washing with water to remove a substantial portion of the residual coolant on the SWARF particles.

4. The process according to claim 3 wherein the SWARF particles after the displacement washing step are subject to a counter-current washing comprising at least three (3) stages wherein the SWARF particles pass progressively from the first stage to the second stage to the third stage and the water wash fluid passes progressively from the third stage to the second stage to the first stage so that the SWARF particles as they progressively pass through the stages are washed with cleaner wash fluid at each stage.

5. The process according to claim 2 wherein the clean SWARF particles are at least partially dried and burned in the open air.

6. The process according to claim 4 wherein the clean SWARF particles are compressed at an elevated pressure into a predetermined shape to form a formed body; and the formed body is sintered at an elevated temperature between about 950° C. and 1100° C. for a sufficient period of time to sinter the refractory metal SWARF particles in the formed body to yield sintered SWARF formed bodies.

7. The process according to claim 4 including the steps of mixing the clean SWARF particles thoroughly with an alkali metal halide salt to produce a SWARF/salt mixture;

pressing the SWARF/salt mixture at elevated pressures to form pressed SWARF/salt formed bodies; and drying the pressed SWARF/salt formed bodies at an elevated temperature under conditions to prevent the ignition and combustion of the formed bodies to produce dried pressed SWARF/salt formed bodies.

8. The process according to claim 7 wherein the alkali metal halide salt is selected from the group consisting of an alkali metal refractory metal fluoride salt and alkali metal aluminum fluoride salt.

9. A process according to claim 8 wherein the alkali metal refractory metal halide is a potassium titanium fluoride salt.

10. The process according to claim 8 wherein the alkali metal refractory metal halide salt is a potassium zirconium fluoride salt.

11. The process according to claim 7 wherein the alkali metal halide salt includes an alkali metal refractory metal halide and an alkali metal boron fluoride salt.

12. The process according to claim 7 wherein the alkali metal halide salt is a mixture of an alkali metal refractory metal halide and an alkali metal halide.

13. The process according to claim 12 wherein the alkali metal refractory metal halide is a potassium titanium fluoride salt.

14. The process according to claim 13 wherein the alkali metal halide is potassium fluoride.

15. The process according to claim 11 wherein the alkali metal refractory metal halide salt is potassium titanium fluoride and the alkali metal boron fluoride salt is a potassium boron fluoride salt.

16. The process according to claim 8 wherein the alkali metal refractory metal halide salt is admixed with an alkali metal halide salt.

17. The process according to claim 16 wherein the alkali metal halide salt is potassium fluoride.

18. The process according to claim 7 wherein the dried SWARF/salt formed bodies on a dry basis comprise by weight about 10% to about 65% alkali metal halide salt with the balance being refractory metal SWARF particles.

19. The process according to claim 7 wherein the SWARF/salt mixture is pressed at a pressure of at least 5000 pounds psi to form the SWARF/salt formed bodies.

20. The process according to claim 6 wherein the SWARF particles are pressed at a pressure of at least 5,000 pounds psi to produce the formed bodies.

21. The process according to claim 4 wherein the clean SWARF particles are compressed at an elevated pressure to form a formed body; the formed body is dried at an elevated temperature in a vacuum to form a dried formed body; and the dried formed body is packaged to form a dried packaged formed body of refractory metal.

22. The process according to claim 21 wherein the dried formed body is packaged by wrapping the dried formed body with aluminum foil.

23. The process according to claim 21 wherein the dried formed body is packaged by wrapping the dried formed body with a plastic film.

24. The process according to claim 21 wherein the dried formed body is packaged by coating the dried formed body with a coating material.

25. The process according to claim 21 wherein the dried formed body are packaged by coating the dried formed body with an paraffin wax.

26. The process according to claim 2 including the step of producing the refractory metal SWARF slivers by grinding a refractory metal with an abrasive tool with sufficient coolant so that the coolant does not reach its boiling point temperature to prevent the produced SWARF from being heated to a temperature of 650° C. or more.

27. A process for converting refractory metal SWARF slivers into clean refractory metal SWARF particles substantially free from coolant components used during the production of SWARF, comprising the steps of:

comminuting refractory metal SWARF slivers in an aqueous detergent slurry with an intensive mixer to break up the refractory metal SWARF slivers into smaller refractory metal SWARF particles and to fracture and separate refractory metal oxides, nitrides and carbides from the refractory metal SWARF particles and slivers and to wash the residual coolant entrained in the refractory metal SWARF slivers from the refractory metal SWARF slivers and particles;

separating the refractory metal SWARF particles from the aqueous detergent slurry; and washing the refractory metal SWARF particles with wash water to yield clean refractory metal SWARF particles.

28. The process according to claim 27 wherein the clean refractory metal SWARF particles are slurried with fresh, clean wash water to further clean the SWARF particles, and the SWARF particles are then separated from the wash slurry.

29. The process according to claim 27 wherein the clean refractory metal SWARF particles having heavy metal objects contained therein are slurried with water and passed to a filter, the slurrying action being sufficient to slurry the clean SWARF particles in the water but being insufficient to slurry the heavy metal objects, and thereafter separating the clean SWARF particles/water slurry from the heavy metal objects.

30. The process according to claim 29 wherein the water in the clean SWARF particles/water slurry is separated from the clean SWARF particles in the slurry on the filter.

31. The process according to claim 30, wherein the clean SWARF particles after separation from the water are washed with at least one (1) displacement washing with water on the filter.

32. The process according to claim 27 wherein the clean SWARF particles containing acid leachable materials are separated from the wash water and subject to an acid leach with aqueous mineral acid to leach out and remove the acid leachable materials from the clean SWARF particles to yield clean SWARF particles substantially free of acid leachable materials; and washing the resulting clean SWARF particles with water to remove aqueous mineral acid salts from the clean SWARF particles.

33. The process according to claim 27 wherein the refractory metal SWARF slivers contain magnetic particles and magnets are introduced into the slurry during comminution of the refractory metal SWARF slivers to remove the magnetic particles from the slurry.

34. A refractory metal packaged formed body suitable for alloying in refractory metal master alloys comprising a compressed formed body of refractory metal SWARF particles substantially free of refractory metal oxides, nitrides and carbides, substantially free of coolant components utilized in the production of SWARF, the refractory metal formed body comprising clean refractory metal particles having an aspect ratio of less than 5:1, the refractory metal formed body being packaged to prevent refractory metal SWARF particles from dropping off the formed body.

35. The refractory metal formed body of claim 34 wherein the refractory metal formed body is fully wetted with water.

36. The refractory metal formed body of claim 34 wherein the refractory metal formed body contains less than 1% moisture.

37. The refractory metal formed body of claim 34 wherein the refractory metal is titanium.

38. The refractory metal formed body of claim 34 wherein the refractory metal formed body is wrapped with aluminum foil.

39. The refractory metal formed body of claim 34 wherein the refractory metal is zirconium.

40. A refractory metal SWARF formed body suitable for alloying in refractory metal master alloys comprising a compressed formed body of refractory metal SWARF particles substantially free of refractory metal oxides, nitrides and carbides, substantially free of coolant components utilized in the production of SWARF, the refractory metal SWARF formed body comprising clean refractory SWARF particles having an aspect ration of less than 5:1, the refractory metal SWARF formed body having a density of at least about 2.82.

41. The refractory metal SWARF formed body of claim 40 wherein the refractory metal SWARF formed body is dried to a moisture content of less than 1%.

42. The refractory metal SWARF formed body of claim 40 wherein the refractory metal formed body has a moisture content of 0.05% or less.

43. The refractory metal SWARF formed body of claim 40 wherein the refractory metal is titanium.

44. The refractory metal SWARF formed body of claim 40 wherein the refractory metal SWARF formed body is packaged with an aluminum foil wrap.

45. Refractory metal SWARF particles substantially free of refractory metal oxides and nitrides and substantially of free of grinding fluid components used in the production of refractory metal SWARF.

46. The refractory metal SWARF of claim 45 wherein the refractory metal SWARF is titanium metal SWARF.

47. The refractory metal SWARF particles of claim 45 wherein the refractory metal SWARF is zirconium metal SWARF.

48. A method of producing refractory metal SWARF particles substantially free of refractory metal oxides and nitrides and substantially free of coolant and other grinding fluid components used in refractory metal grinding operations from SWARF refractory metal slivers having adherent coolant, coolant components and grinding media produced in a refractory metal grinding operation comprising: comminuting refractory metal SWARF slivers having adherent coolant in an intensive mixer to reduce the SWARF refractory metal slivers to refractory metal SWARF particles having length to width aspect ratios substantially less than the slivers and to fracture and separate refractory metal oxides and nitrides from the refractory metal SWARF; separating the refractory metal SWARF particles from the separated refractory metal oxides and nitrides; separating the refractory metal SWARF particles from the released adherent coolant; and washing the refractory metal SWARF particles with wash water to remove the remaining adherent coolant to yield washed refractory metal SWARF particles.

49. The method according to claim 48 wherein the refractory metal SWARF slivers are a mixture of coarse SWARF slivers and fine SWARF slivers, and the refractory metal SWARF slivers with its adherent coolant are screened to remove the coarse SWARF slivers with some adherent coolant from the fine SWARF slivers and the remaining adherent coolant prior to comminution.

50. The method according to claim 49 wherein the fine SWARF silvers are filtered to separate the fine SWARF slivers from the bulk of the remaining adherent coolant.

51. The method according to claim 50 wherein the separated adherent coolant is recycled back into a refractory metal grinding operation.

52. The method according to claim 48 wherein the refractory metal SWARF slivers have a length to width aspect ratio of from 20:1 to 200:1 and the refractory metal SWARF particles after comminution have a length to width aspect ratio below 5:1.

53. The method according to claim 48 wherein the washing of the refractory metal SWARF particles comprises at least a displacement wash with wash water followed by a separation of the washed refractory metal SWARF particles from the wash water.

54. The method according to claim 53 wherein the washed refractory metal SWARF particles following the displacement wash and separation are subject to at least three counter current washes with wash water.

55. The method according to claim 54 wherein the wash water from the counter current washes is used in the displacement wash.

56. The method according to claim 54 wherein the wash water are separated from the refractory metal SWARF particles by settling and decantation, centrifuge separation, screening, or filtration.

57. The method according to claim 54 wherein the washes remove coolant components, grinding media from the refractory metal SWARF particles.

58. The method according to claim 54 wherein the washes are carried out with water or aqueous solutions.

59. The method according to claim 48 wherein the SWARF refractory metal slivers are SWARF titanium slivers.

60. The method according to claim 48 wherein the SWARF refractory metal silvers are SWARF zirconium slivers.

61. The method according to claim 48 wherein the washed refractory metal SWARF particles are compacted and dried.

62. The method according to claim 53 wherein the washed refractory metal SWARF particles are compacted and dried.

63. The method according to claims 54 wherein the washed refractory metal SWARF particles are compacted and dried.

64. The method according to claim 61 wherein the refractory metal SWARF particles are titanium SWARF particles.

65. Clean refractory metal SWARF particles substantially free of refractory metal oxides and nitrides and substantially free of coolant components and other grinding fluid components used in refractory metal grinding operation from SWARF refractory metal slivers having adherent coolant produced in a refractory metal grinding operation, the refractory metal SWARF particles produced by comminuting the SWARF refractory metal slivers with the adherent coolant in an intensive mixer to reduce the SWARF refractory metal silvers to refractory metal SWARF particles having length to width aspect ratios substantially less than the slivers and to fragment and separate refractory metal oxides and nitrides from the SWARF slivers and release adherent coolant; separating the refractory metal SWARF particles from the refractory metal oxides and nitrides; separating the refractory metal SWARF particles from the released adherent coolant; and washing the refractory metal SWARF particles with water to remove remaining coolant components from the refractory metal SWARF particles to yield clean refractory metal SWARF particles.

66. The refractory metal SWARF slivers according to claim 65 wherein the refractory metal SWARF slivers comprised of fine SWARF slivers and coarse SWARF slivers, and the refractory metal SWARF slivers with adherent coolant is screened to remove the coarse SWARF slivers with some residual coolant from fine SWARF particles and the remaining adherent coolant prior to comminution.

67. The refractory metal SWARF particles according to claim 66 wherein the fine SWARF particles are filtered to separate the fine SWARF particles are filtered to separate the fine SWARF particles from the bulk of the remaining adherent coolant.

68. The refractory metal SWARF particles according to claim 67 wherein the separated coolant is recycled back into a refractory metal grinding operation.

69. The refractory metal SWARF particles according to claim 65 wherein the SWARF refractory metal slivers have a length to width aspect ratio of from 20:1 to 200:1 and the refractory metal SWARF particles after comminution have a length to width aspect ratio below 5:1.

70. The refractory metal SWARF particles according to claim 65 wherein the washing of the refractory metal SWARF particles comprises at least a displacement wash with wash water followed by a separation of the washed refractory metal SWARF particles from the wash water.

71. The refractory metal SWARF particles according to claim 70 wherein the washed refractory metal SWARF particles following the displacement wash and separation are subject to at least three counter current washes with wash water.

72. The refractory metal SWARF particles according to claim 71 wherein the wash water from the counter current washes is used as the displacement wash water.

73. The refractory metal SWARF particles according to claim 71 wherein the wash water is separated from the refractory metal SWARF particles by settling and decantation, centrifuge separation, screening, or filtration.

74. The refractory metal SWARF particles according to claim 71 wherein the wash steps removes coolant components, and grinding media from the refractory metal SWARF particles.

75. The refractory metal SWARF particles according to claim 71 wherein the wash steps are carried out with water, or aqueous solutions.

76. The refractory metal SWARF particles of claim 65 wherein the refractory metal SWARF slivers are SWARF slivers.

77. The refractory metal SWARF particles of claims 65 wherein the refractory metal SWARF slivers are zirconium SWARF slivers.

78. The refractory metal SWARF particles of claim 65 wherein the clean refractory metal SWARF particles are compacted and dried.

79. The refractory metal SWARF particles of claim 70 wherein the clean refractory metal SWARF particles are compacted and dried.

80. The refractory metal SWARF particles of claim 71 wherein the clean refractory metal SWARF particles are compacted and dried.

81. The refractory metal SWARF particle of claim 78 wherein the refractory metal SWARF particles are titanium SWARF particles.

82. The refractory metal SWARF particle of claim 78 wherein the refractory metal SWARF particles are zirconium SWARF particles.

* * * * *